(12) United States Patent
Bryson et al.

(10) Patent No.: US 9,978,108 B2
(45) Date of Patent: May 22, 2018

(54) METHOD AND SYSTEM FOR CONTROLLING VEHICLES AND DRONES

(71) Applicant: International Business Machines Corporation, Armonk, NY (US)

(72) Inventors: Donald L. Bryson, Chattanooga, TN (US); Eric V. Kline, Rochester, MN (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days. days.

(21) Appl. No.: 15/716,127

(22) Filed: Sep. 26, 2017

(65) Prior Publication Data

US 2018/0012319 A1  Jan. 11, 2018

Related U.S. Application Data

(63) Continuation of application No. 15/040,542, filed on Feb. 10, 2016.

(51) Int. Cl.
| | |
|---|---|
| *G01C 22/00* | (2006.01) |
| *G06Q 50/14* | (2012.01) |
| *G01C 21/34* | (2006.01) |
| *G05D 1/10* | (2006.01) |
| *G05D 1/02* | (2006.01) |

(52) U.S. Cl.
CPC ......... *G06Q 50/14* (2013.01); *G01C 21/3438* (2013.01); *G05D 1/0291* (2013.01); *G05D 1/104* (2013.01)

(58) Field of Classification Search
CPC .......................... G06Q 50/14; G01C 21/3438
See application file for complete search history.

(56) References Cited

U.S. PATENT DOCUMENTS

| | | | |
|---|---|---|---|
| 2015/0370251 A1 | 12/2015 | Siegel et al. | |
| 2017/0169366 A1* | 6/2017 | Klein | G06Q 10/025 |
| 2017/0211940 A1 | 7/2017 | Baughman et al. | |
| 2017/0227368 A1 | 8/2017 | Bryson et al. | |
| 2017/0249846 A1 | 8/2017 | Ignaczak et al. | |
| 2017/0300049 A1* | 10/2017 | Seally | G05D 1/0027 |

OTHER PUBLICATIONS

List of IBM Patents or Patent Applications Treated as Related; (Appendix P), Filed Oct. 31, 2017, 2 pages.

* cited by examiner

*Primary Examiner* — Adam M Alharbi
(74) *Attorney, Agent, or Firm* — Cantor Colburn LLP

(57) ABSTRACT

Embodiments are provided for controlling a fleet of vehicles and drones. The vehicles are directed to respectively drop off passenger groups at multiple locations. Routes are calculated routes for the vehicles to respectively pick up the passenger groups from the multiple locations based on predicted pick-up times, passenger group sizes and available vehicle capacities. One or more assign drones are assigned to each passenger group at each location. Each drone is configured to broadcast a current location of the passenger group in the location and a corresponding one of the predicted pick-up times and delay the corresponding passenger group in the location based on one of the vehicles assigned as a pick-up vehicle for the passenger group being delayed.

1 Claim, 4 Drawing Sheets

METHOD AND SYSTEM FOR CONTROLLING VEHICLES AND DRONES

This application is a continuation of U.S. application Ser. No. 15/040,542 filed Feb. 10, 2016. The entire disclosures of U.S. application Ser. No. 15/040,542 are incorporated herein by reference.

BACKGROUND

The present invention relates to a method and system for controlling vehicles and drones and, more specifically, to a method and system for controlling vehicles and drones in an automated tourist guiding system.

The use of driverless vehicles has increased recently and is expected to continue to increase. As they become more and more common, driverless vehicles will be used in various applications. These applications include, for example, the use of autonomous driverless vehicles by travel agencies. In these cases, a traveler will be able to select one or more travel packages with multiple points of interest (POIs) that are served by a travel agency using autonomous driverless vehicles and those autonomous driverless vehicles will then transport the traveler to those POIs. In cases where there are multiple travelers, however, each traveler may want to visit different POIs along a particular route and it will not be possible to easily service each travelers preferences. For example, some of the travelers might have to wait to be picked up or will need a separate vehicle from other travelers. In the latter case, the travelers might need guidance to the other vehicle.

SUMMARY

According to an embodiment of the present invention, a computer program product for controlling a fleet of vehicles and drones is provided. The computer program product includes a computer readable storage medium having program instructions embodied therewith. The program instructions are readable and executable by a processing circuit to cause the processing circuit to direct the vehicles to respectively drop off passenger groups at multiple locations, calculate routes for the vehicles to respectively pick up the passenger groups from the multiple locations based on predicted pick up times, passenger group sizes and available vehicle capacities and assign one or more of the drones to each passenger group at each location. Each drone is configured to broadcast a current location of the passenger group in the location and the corresponding one of the predicted pick-up times and delay the corresponding passenger group in the location based on one of the vehicles assigned as a pick-up vehicle for the passenger group being delayed.

According to another embodiment of the present invention, a computing system for controlling a fleet of vehicles and drones is provided. The computing system includes a memory and a processing circuit coupled to the memory. The processing circuit is configured to direct the vehicles to respectively drop off passenger groups at multiple locations, calculate routes for the vehicles to respectively pick up the passenger groups from the multiple locations based on predicted pick up times, passenger group sizes and available vehicle capacities and assign one or more of the drones to each passenger group at each location. Each drone is configured to broadcast a current location of the passenger group in the location and the corresponding one of the predicted pick-up times and delay the corresponding passenger group in the location based on one of the vehicles assigned as a pick-up vehicle for the passenger group being delayed.

According to yet another embodiment of the present invention, a computer-implemented method for controlling a fleet of vehicles and drones is provided and includes directing the vehicles to respectively drop off passenger groups at multiple locations, calculating routes for the vehicles to respectively pick up the passenger groups from the multiple locations based on predicted pick up times, passenger group sizes and available vehicle capacities, assigning one or more of the drones to each passenger group at each location, configuring each drone to broadcast a current location of the passenger group in the location and the corresponding one of the predicted pick-up times and configuring each drone to delay the corresponding passenger group in the location based on one of the vehicles assigned as a pick-up vehicle for the passenger group being delayed.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Current uses of driverless vehicles include multiple arrangements. In one, service vehicles operate in pairs with the lead vehicle providing an all-stop local service and the second vehicle skipping some stops as an express service in order to minimize the costs for both operators and passengers. In other cases, scheduled and fixed route bus services are available that allow passengers to board and disembark buses on their own. Meanwhile, optimized bus scheduling is used and takes into consideration bus stop locations and route segments of a city in an integrated manner using a Demand and travel Time Response (DTR) method to optimize fixed bus timetables. Still other situations call for optimizing a variable-demand bus corridor system by adopting dynamic scheduling of buses that simulate the flow of passengers at multiple stops as well as the movement of buses along the routes.

As will be described below, a method and system are provided for controlling vehicles and drones in various applications, including, but not limited to, an automated tourist guiding system. Using the method and system, travel will be organized with combination of multiple driverless vehicles and multiple guiding drones in each driverless vehicle. The drones will be travelling along with the vehicle, and will fly or land in the vehicle as required. While boarding each driverless vehicle, each traveler will be identified uniquely with his profile and points of interest (POIs) accordingly identified. When each traveler gets off the vehicle to visit a given one of the POIs, one or more drones will be assigned to him or his group for guidance. The assigned drone will then guide the traveler(s) around the POI and will communicate with a remote server about their current position and how long it will be until they need to re-board. By way of a least square method or another suitable calculating algorithm, the remote server will identify optimum routes of the driverless vehicles to pick up the traveler(s) from different POIs and will also identify the number of vehicles required to complete all pick-ups. Then, if it is found that an assigned driverless vehicle needs more than a threshold limit of time to pick up the traveler(s) from any one POI, the corresponding drone will guide the traveler(s) to visit additional attractions, like food carts, shopping complexes, etc., so that they can spend time effectively until the driverless vehicles can arrive.

Figure 1:
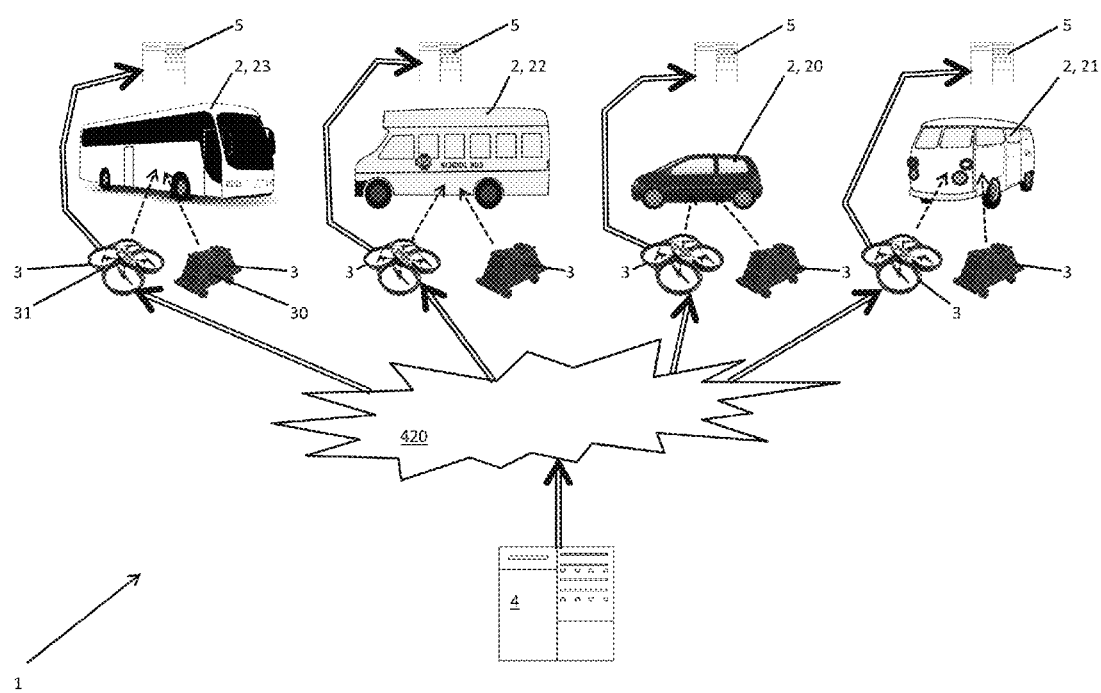
FIG. 1 is a schematic diagram of a fleet of vehicles and drones and a remote server in accordance with embodiments.
Figure 2:
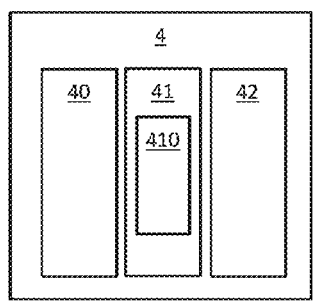
FIG. 2 is a schematic diagram of the remote server of FIG. 1.

With reference to FIGS. 1 and 2, a system 1 is provided to control various operations of a fleet of vehicles 2 and drones 3. The system 1 includes the vehicles 2, which may be provided as a plurality of cars 20, vans 21, mini-buses 22 and buses 23, the drones 3, which may be provided as manned or unmanned ground vehicles 30 and as manned or unmanned aircraft 31, as well as a remote server 4. During their respective operations, the vehicles 2 and the drones 3 may be operated remotely by an operator or may be provided as partially or fully autonomous vehicles/drones. As shown in FIG. 2, the remote server 4 includes a processing circuit 40, a memory, such as a computer readable storage medium 41 and a networking unit 42 by which the processing circuit 40 communicates with each of the vehicles 2 and the drones 3 over a wired or wireless network 420. The computer readable storage medium 41 has executable instructions stored thereon, which, when executed cause the processing circuit 40 to execute the actions described herein.

Figure 3:
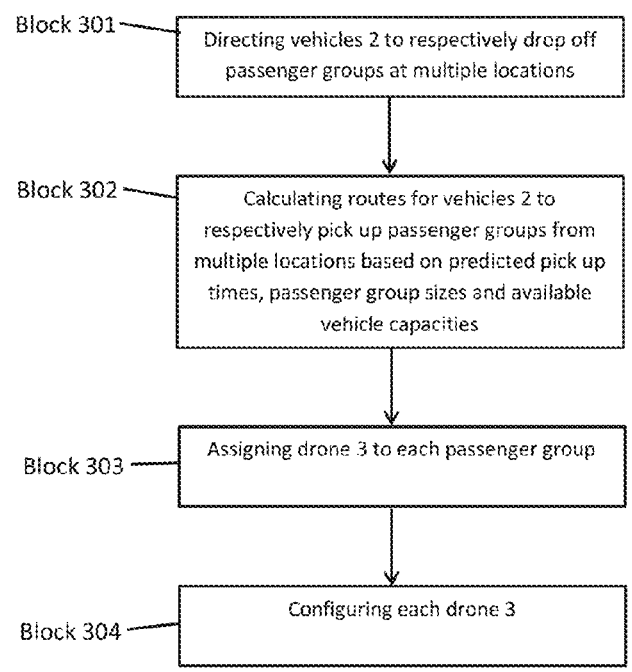
FIG. 3 is a flow diagram illustrating a computer-implemented method for controlling a fleet of vehicles and drones.

In accordance with embodiments and, with reference to FIG. 3, a computer-implemented method for controlling a fleet of the vehicles 2 and the drones 3 is provided for execution by the remote server 4. The computer-implemented method includes directing the vehicles 2 to respectively drop off passenger groups at multiple locations or POIs (e.g., tourist POIs in the exemplary case of the system 1 being a tourism service or commuter POIs in the case of the system 1 being a local commuter service) at block 301, calculating routes for the vehicles 2 to respectively pick up the passenger groups from the multiple locations based on predicted pick up times, passenger group sizes and available vehicle capacities at block 302, assigning one or more of the drones 3 to each passenger group at each location at block 303 and configuring each drone 3 at block 304. The configuring includes configuring the drones 3 to broadcast to the remote server 4 a current location of the passenger group in the location and the corresponding one of the predicted pick-up times. The configuring further includes configuring the drones 3 to delay the corresponding passenger group in the location based on one of the vehicles 2 assigned as a pick-up vehicle for the passenger group being delayed.

It is to be understood that the various actions noted above may be executed in various sequences and orders and that the order provided in the present description is merely exemplary and should not be considered to be limiting in any way. For example, the assigning of the one of the drones 3 to each of the passenger groups at each location at block 303 could precede the calculating of the routes for the vehicles 2 to respectively pick up the passenger groups from the multiple locations based on the predicted pick up times, the passenger group sizes and the available vehicle capacities at block 302.

The broadcasting may be achieved by the drones 3 by way of various wired or wireless networking systems. In an exemplary case, the drones 3 may be communicative with the remote server 4 by way of cellular communications systems. In further alternative embodiments, the drones 3 may communicate with the remote server 4 by way of proxy servers 5 dispersed throughout the system 1 (see FIG. 1).

In accordance with further embodiments, the drones 3 may be configured to communicate with each individual in its assigned group and/or with a specified leader of the assigned group. Such communication may be achieved by way of various manners including, but not limited to, Bluetooth, walkie-talkie or cellular communications.

In accordance with embodiments, a delay for the pick-up vehicle may be determined to be a difference between a predicted pick-up time broadcast by a drone 3 for a given passenger group at a given POI and an expected arrival time of the pick-up vehicle at the POI based on current vehicle 2 locations and traffic conditions. Here, the drone 3 may be configured to delay the passenger group at the POI where the delay exceeds a predetermined period of time (e.g., fifteen minutes standard or five minutes for "high-priority" passengers to be described below). In accordance with further embodiments, the drones 3 may be configured to continuously recalculate predicted pick-up times in real-time such that, when the decision is made to delay the passenger group, the corresponding drone 3 is capable of broadcasting a new predicted pick-up time for that passenger group.

The calculating of block 302 may be designed and tuned such that total aggregated costs (considering all the participating vehicles 2 and drones 3) cost is limited and such that waiting times for travelers is minimized. In addition, the calculating may take into account the possibility of some travelers having paid for premium services whereby they are offered priority drop-off and pick-up services as compared to those who have not paid of premium services. That is, for those cases in which "high-priority" travelers are involved, the system 1 will seek to resolve drop-off or pick-up conflicts between "low-priority" and "high-priority" passengers in favor of the "high-priority" passengers.

In accordance with further embodiments, "high-priority" passengers could be guaranteed a pick-up from a given POI in less than a predetermined period of time (e.g., 5 minutes). In accordance with further embodiments, "high-priority" passengers could be driven to precise locations near their POIs whereas "low-priority" passengers will be limited to drop-offs and pick-ups along logical routes.

In accordance with embodiments and, with reference to FIGS. 4 and 5, an operation of the system 1 described above will now be described. For the purposes of clarity and brevity, the system 1 will be assumed to be associated with a travel or tourism service that has only a single type of standard priority passengers. However, it is to be understood that this is merely exemplary and that other embodiments of the system 1 are available will multiple or various levels of passenger priorities.

Figure 4:
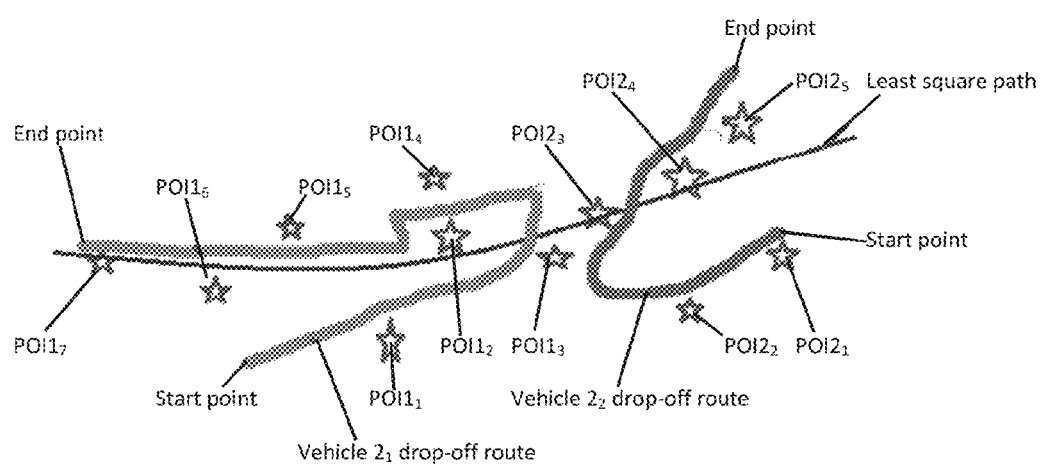
FIG. 4 is a flow diagram of a drop-off plan generated by the system of FIGS. 1 and 2.
Figure 5:
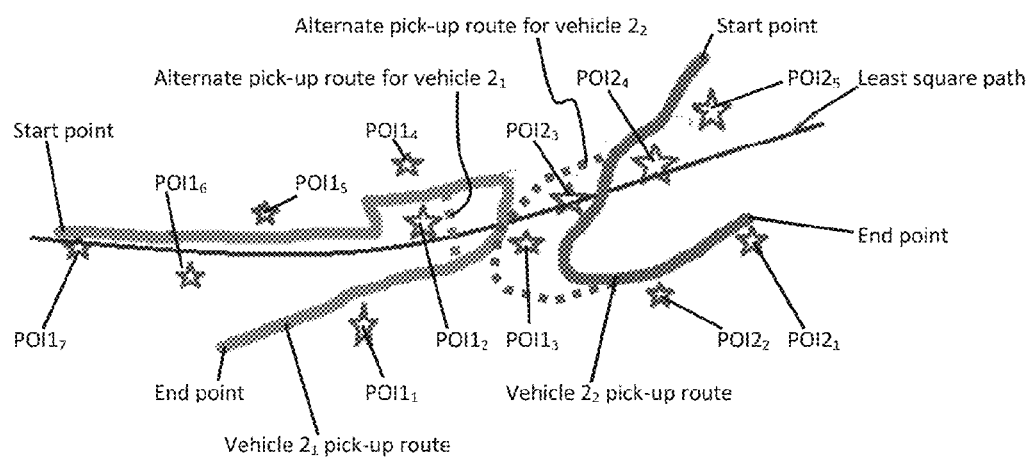
FIG. 5 is a flow diagram of a first routing plan and alternate routing plans generated by the system of FIGS. 1 and 2 based on first conditions being in effect.

As shown in FIG. 4, the travel service has two vehicles 2. These include vehicle $2_1$, which services POIs$1_{1-7}$, and vehicle $2_2$, which services POIS$2_{1-5}$. Both sets of the POIs define a least square path or another similar reductive path that the vehicle $2_1$ and the vehicle $2_2$ generally follow during drop-off procedures. For the vehicle $2_1$, the drop-off procedure begins at the start point and proceeds to POI$1_1$, POI$1_2$ and so one until reaching POI$1_7$ and the end point. Similarly, for the vehicle $2_2$, the drop-off procedure begins at the start point and proceeds to $POI2_1$, $POI2_2$ and so one until reaching $POI2_5$ and the end point. Each of the two vehicles carries a multitude of passengers who have all been identified upon boarding and registered as being interested in visiting certain ones of the points of interest. For example, the sets of passengers who want to visit $POI1_1$ or $POI1_2$ will be initially assigned to vehicle $2_1$ whereas the sets of passengers who want to visit $POI2_1$ or $POI2_2$ will be initially assigned to vehicle $2_2$.

When each of the two vehicles $2_1$ and $2_2$ reach a given one of the POIs, the groups of passengers who wish to visit the POIs disembark the vehicles $2_1$ and 22 along with drones 3. That is, when the vehicle $2_1$ reaches $POI1_1$, those passengers who wish to visit $POI1_1$ disembark and enter $POI1_1$ along with the drone 3 assigned to guide them through along the visit. Meanwhile, when the vehicle $2_2$ reaches $POI2_1$, those passengers who wish to visit $POI2_1$ disembark and enter $POI2_1$ along with the drone 3 assigned to guide them through along their visit.

While each passenger group visits each POI, their assigned drone 3 guides the passengers through the POI and may provide detailed narration or information along the way. Simultaneously, the drone 3 remains in communication with the remote server 4 directly or by way of the proxy servers 5 such that the drone can communicate the location of the passenger group within the POI as well as the predicted pick-up time for the passenger group. This predicted pick-up time is calculated based on the content of the tour of the POI as well as the speed with which the passenger group is moving through the POI. Thus, a faster (i.e., younger) group will probably have an earlier pick-up time than an older or slower group from a same POI with a same starting time.

In accordance with embodiments, baseline pick-up routing for the system 1 may be a simple reverse course for each of the vehicles $2_1$ and $2_2$ along the least square path or another similar reductive path. Thus, as shown in FIG. 5, for the vehicle $2_1$, the baseline pick-up procedure begins at the start point and proceeds to $POI1_7$, $POI1_6$ and so one until reaching $POI1_1$ and the end point while the pick-up procedure for vehicle $2_2$ begins at the start point and proceeds to $POI2_5$, $POI2_4$ and so one until reaching $POI2_1$ and the end point.

However, since there are cases in which either of the vehicles $2_1$ or $2_2$ may be delayed or some of the passenger groups may complete their visit sooner than expected, the baseline pick-up procedures may need to be adjusted. For example, if the drone 3 assigned to the passenger group visiting $POI1_3$ broadcasts a predicted pick-up time to the remote server 4 that is earlier than expected, the vehicle $2_1$ may not be able to reliably arrive at $POI1_3$ within a predetermined time from that predicted pick-up time. In a case like this, the drone 3 may delay the passenger group within the $POI1_3$ by directing the passenger group toward a cafeteria or a gift shop so that the passengers within the passenger group do not experience an undesirably long wait time for vehicle $2_1$. Alternatively (and especially in a case where the passenger group at $POI1_3$ is "high-priority"), the drone 3 will broadcast the early predicted pick-up time and the remote server 4 will recalculate pick-up routing for the vehicles $2_1$ and $2_2$. Such recalculations of the pick-up routing may result in the alternative pick-up routes for the vehicles $2_1$ and $2_2$ as shown in FIG. 5. These alternative pick-up routes would involve the vehicle $2_1$ ultimately skipping $POI1_3$ and thus proceeding from $POI1_4$ to $POI1_2$ directly and the vehicle $2_2$ proceeding from $POI2_4$ and $POI2_3$ to $POI1_3$ before reaching $POI2_2$.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for controlling vehicles and drones, the system comprising a processing circuit configured to:
   control the vehicles by directing the vehicles to drop off passengers at multiple locations and by calculating routes for the vehicles to respectively pick up the passengers from the multiple locations based on predicted pick-up times, numbers of passengers and vehicle capacities; and
   control the drones by assigning one or more of the drones to passengers at each location, each drone being controllable to broadcast a current location of the passengers in the location and a corresponding one of the predicted pick-up times and to delay the passengers in the location based on one of the vehicles assigned as a pick-up vehicle for the passengers in the location being delayed.

* * * * *